US011803253B2

(12) United States Patent
Karri et al.

(10) Patent No.: US 11,803,253 B2
(45) Date of Patent: Oct. 31, 2023

(54) KEYWORD RECOMMENDATIONS FOR VIRTUAL KEYBOARDS

(71) Applicant: INTERNATIONAL BUSINESS MACHINES CORPORATION, Armonk, NY (US)

(72) Inventors: Venkata Vara Prasad Karri, Visakhapatnam (IN); Sarbajit K. Rakshit, Kolkata (IN); Partho Ghosh, Kolkata (IN); Sandeep Kaur, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/456,649

(22) Filed: Nov. 29, 2021

(65) Prior Publication Data

US 2023/0168749 A1 Jun. 1, 2023

(51) Int. Cl.
*G06F 3/023* (2006.01)
*G06N 5/022* (2023.01)
*G06F 40/279* (2020.01)
*G06F 3/0481* (2022.01)
*G06F 40/205* (2020.01)
(Continued)

(52) U.S. Cl.
CPC .......... *G06F 3/0237* (2013.01); *G06F 3/0481* (2013.01); *G06F 3/04842* (2013.01); *G06F 3/04886* (2013.01); *G06F 40/205* (2020.01); *G06F 40/279* (2020.01); *G06N 5/022* (2013.01)

(58) Field of Classification Search
CPC .. G06F 3/0237; G06F 3/0481; G06F 3/04886; G06F 40/205; G06F 40/279; G06F 3/04842; G06N 5/022
See application file for complete search history.

(56) References Cited

U.S. PATENT DOCUMENTS

| 9,852,599 | B1* | 12/2017 | Slavin | A61B 5/443 |
| 9,883,358 | B2* | 1/2018 | Kalkounis | H04W 4/12 |
| 10,257,256 | B2* | 4/2019 | Schilit | G06F 3/0484 |

(Continued)

OTHER PUBLICATIONS

Disclosed Anonymously, "An AI and IoT Based System and Method to Recommend Unproductive Timeslots for Urgent and Quick Meetings and Tasks", IP com No. IPCOM00262591D, Jun. 13, 2020, pp. 1-6.

(Continued)

*Primary Examiner* — Matthew Ell
*Assistant Examiner* — Kenny Nguyen
(74) *Attorney, Agent, or Firm* — Tihon Poltavets

(57) ABSTRACT

A method for providing keyword recommendations for a virtual keyboard includes, in responsive to determining a user is interacting with a virtual keyboard, identifying one or more devices associated with text inputted as written content into a text field in a user interface. The method includes identifying one or more portions of the written content relating to data generated by the one or more devices. The method includes identifying one or more portions of the data generated. In response to converting the one or more portions of the data generated to text, the method includes displaying the text for the one or more portions of the data generated by the one or more devices. In response to receiving a text selection with the text, the method includes displaying the text selection with the written content in the text field in the user interface.

20 Claims, 6 Drawing Sheets

(51) Int. Cl.
*G06F 3/04886* (2022.01)
*G06F 3/04842* (2022.01)

(56) References Cited

U.S. PATENT DOCUMENTS

| | | | | |
|---|---|---|---|---|
| 10,586,437 | B1* | 3/2020 | Slavin | A61B 5/002 |
| 10,680,996 | B2 | 6/2020 | Ge | |
| 10,740,826 | B2* | 8/2020 | Carr | G06Q 30/0633 |
| 10,855,485 | B1* | 12/2020 | Zhou | G10L 15/183 |
| 11,025,566 | B2* | 6/2021 | Blandin | H04L 51/02 |
| 11,029,819 | B2* | 6/2021 | Gerges | G06F 3/0482 |
| 11,228,810 | B1* | 1/2022 | Arazi | H04N 21/6582 |
| 11,301,525 | B2* | 4/2022 | Lv | G06N 20/00 |
| 2013/0275164 | A1* | 10/2013 | Gruber | G10L 15/22 |
| | | | | 705/5 |
| 2014/0237487 | A1* | 8/2014 | Prasanna | G06Q 10/0639 |
| | | | | 719/318 |
| 2014/0372933 | A1* | 12/2014 | Shirolkar | G06F 40/18 |
| | | | | 715/780 |
| 2016/0179816 | A1* | 6/2016 | Glover | G06F 16/24578 |
| | | | | 707/767 |
| 2016/0330597 | A1* | 11/2016 | Kalkounis | H04W 4/02 |
| 2017/0169177 | A1* | 6/2017 | Beale | G16H 30/20 |
| 2017/0300634 | A1* | 10/2017 | Chiang | G16H 10/60 |
| 2017/0344256 | A1 | 11/2017 | Gnedin | |
| 2018/0204641 | A1* | 7/2018 | Herbst | G06Q 10/10 |
| 2018/0300399 | A1* | 10/2018 | Blandin | G06N 5/022 |
| 2019/0102482 | A1* | 4/2019 | Ni | G06F 16/3334 |
| 2019/0221308 | A1* | 7/2019 | Makaron | G16H 50/20 |
| 2019/0326022 | A1* | 10/2019 | El-kalliny | H04L 51/046 |
| 2020/0106841 | A1 | 4/2020 | Delaney | |
| 2020/0363949 | A1 | 11/2020 | Gnedin | |
| 2020/0371647 | A1* | 11/2020 | Gerges | G06F 40/258 |
| 2021/0049719 | A1* | 2/2021 | Quinn | G06F 3/04817 |
| 2021/0051196 | A1* | 2/2021 | Hodgins | H04W 4/08 |
| 2021/0074395 | A1* | 3/2021 | Habboushe | G16H 20/10 |
| 2021/0234818 | A1* | 7/2021 | Jung | H04L 51/02 |
| 2021/0397664 | A1* | 12/2021 | Dharmadhikari | H04L 29/08 |
| 2021/0397788 | A1* | 12/2021 | Yim | G06F 3/04817 |
| 2022/0068482 | A1* | 3/2022 | Zimmerman | G06Q 50/00 |

OTHER PUBLICATIONS

Mell et al., "The NIST Definition of Cloud Computing", National Institute of Standards and Technology, Special Publication 800-145, Sep. 2011, pp. 1-7.

* cited by examiner

KEYWORD RECOMMENDATIONS FOR VIRTUAL KEYBOARDS

BACKGROUND

This disclosure relates generally to virtual keyboards, and in particular to providing device based keyword recommendations for written content utilizing virtual keyboards.

A virtual keyboard is a software component that allows a user of an electronic device to input characters via a touchscreen display. The user can interact with the touchscreen display to input characters, without a need for a separate physical keyboard device. Presently, virtual keyboards are capable of providing autocorrection for misspelled words and word suggestions for written content being inputted by the user into a user interface on the electronic device. A word suggestion tool can predict words utilizing a linguistic database and provide the predicted words for selection by the user in the user interface on the electronic device. The word suggestion tool also utilizes machine learning to identify patterns for the inputted text via the virtual keyboard and based on the identified patterns, provide the predicted words for selection by the user in the user interface on the electronic device.

SUMMARY

Embodiments in accordance with the present invention disclose a method, computer program product and computer system for providing keyword recommendations for virtual keyboards, the method, computer program product and computer system can responsive to determining a user is interacting with a virtual keyboard, identify one or more devices associated with text inputted as written content into a text field in a user interface. The method, computer program product and computer system can identify one or more portions of the written content relating to data generated by the one or more devices. The method, computer program product and computer system can identify one or more portions of the data generated by the one or more devices relating to the one or more portions of the written content. The method, computer program product and computer system can, responsive to converting the one or more portions of the data generated by the one or more devices relating to the one or more portions of the written content to text, display the text for the one or more portions of the data generated by the one or more devices, wherein the text is selectable by the user via the user interface. The method, computer program product and computer system can, responsive to receiving a text selection with the text, display the text selection with the written content in the text field in the user interface.

DETAILED DESCRIPTION

Embodiments of the present invention provide keyword recommendations for a virtual keyboard in a user interface on an electronic device. As a user interacts with the virtual keyboard by inputting characters, embodiments of the present invention analyze inputted content for context and provide keyword recommendations based on data from various devices. The inputted content includes text provided by the user into a field in the user interface and the various device can include Internet of Things (IoT) devices and wearable devices capable of collecting data associated with the user. Based on the context of the inputted content, embodiments of the present invention select a portion of the IoT device and wearable devices that include data that correlates to the context and provide keyword recommendations in the user interface, where the keyword recommendations are selectable by the user inputting the content utilizing the virtual keyboard. Embodiments of the present invention can validate user permission to ensure the data from the various devices is accessible for providing the keyword recommendations as the user inputs content utilizing the virtual keyboard. In a collaborative setting with multiple users, embodiments of the present invention can validate user permissions for every user to ensure the data from the various devices is accessible for providing the keyword recommendations. The collaborative setting can include a particular user inputting content utilizing the virtual keyboard and embodiments of the present invention can predict a role (e.g., doctor, technical specialist) for the particular user relative to another user and identify devices (e.g., smartwatch, IoT device) associated with the other user. Embodiments of the present invention can receive data from the identifies devices associated with the other user and provide keywords to the particular user inputting content utilizing the virtual keyboard in the user interface on the electronic device.

Figure 1:
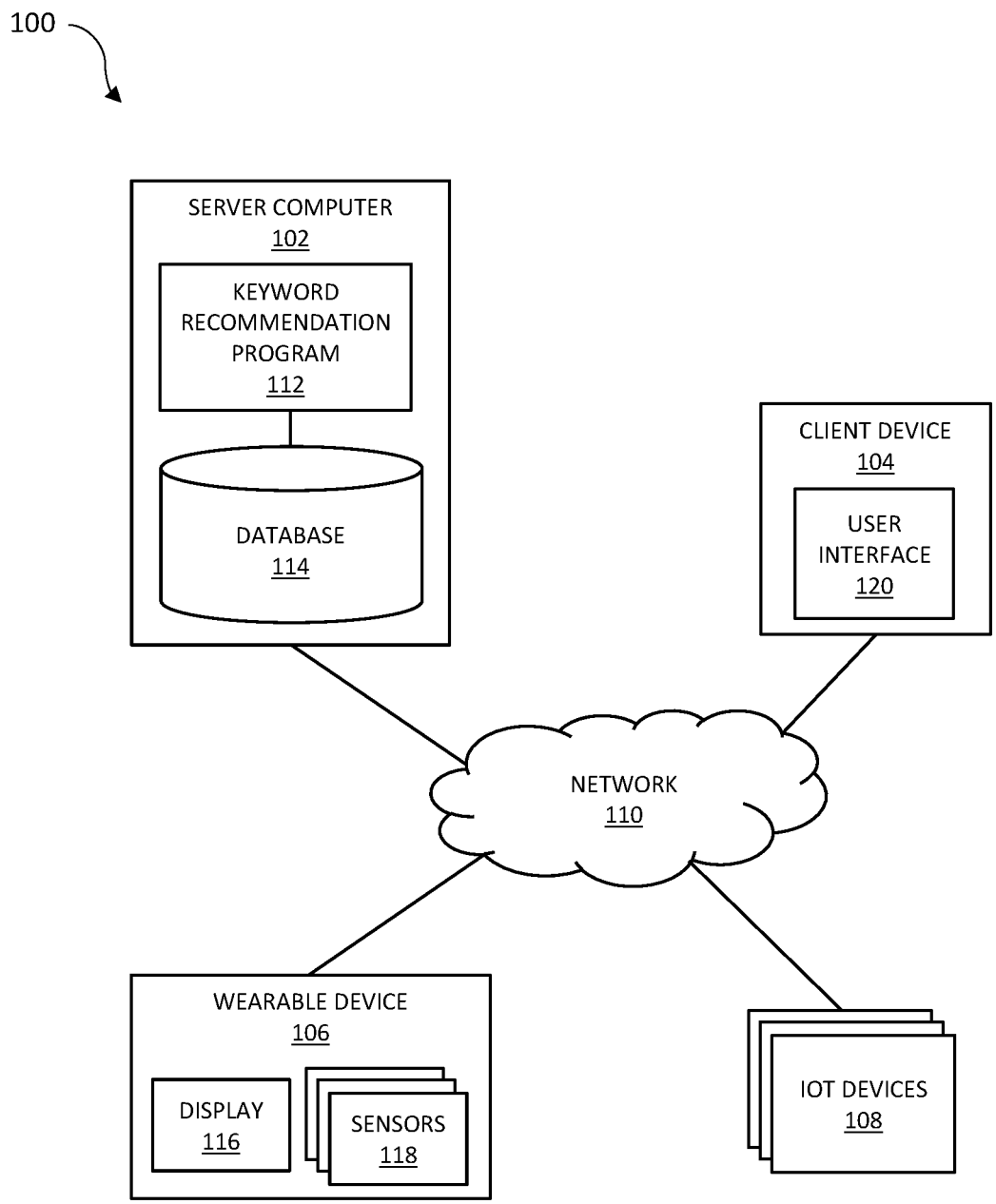
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment includes server computer 102, client device 104, wearable device 106, and Internet of Things (IoT) devices 108 all interconnected over network 110. Server computer 102 can be a standalone computing device, a management server, a web server, a mobile computing device, or any other electronic device or computing system capable of receiving, sending, and processing data. In other embodiments, server computer 102 can represent a server computing system utilizing multiple computers as a server system, such as in a cloud computing environment. In another embodiment, server computer 102 can be a laptop computer, a tablet computer, a netbook computer, a personal computer (PC), a desktop computer, a smart phone, or any programmable electronic device capable of communicating with client device 104, wearable device 106, IoT devices 108, and other computing devices (not shown) within the distributed data processing environment via network 110. In another embodiment, server computer 102 represents a computing system utilizing clustered computers and components (e.g., database server computers, application server computers, etc.) that act as a single pool of seamless resources when accessed within the distributed data processing environment. Server computer 102 includes server-side keyword recommendation program 112 and database 114. Server computer 102 may include internal and external hardware components, as depicted and described in further detail with respect to FIG. 5.

Client device 104 can be a laptop computer, a tablet computer, a smart phone, smartwatch, a smart speaker, or any programmable electronic device capable of communicating with various components and devices within the distributed data processing environment (e.g., server computer 102, wearable device 106, and IoT devices 108), via network 110. Client device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 104 represents one or more programmable electronic devices or combination of programmable electronic devices capable of executing machine readable program instructions and communicating with other computing devices (not shown) within the distributed data processing environment via a network, such as network 110. In one embodiment, client device 104 represents one or more devices associated with a user. Client device 104 includes an instance of user interface 120 for interacting with keyword recommendation program 112.

Wearable device 106 can be a smartwatch, a fitness tracker, smart glasses, an electronic contact lens, an augmented reality (AR) headset, and any programmable user wearable electronic device capable of communicating with various components and devices within the distributed data processing environment (e.g., server computer 102, client device 104, and IoT devices 108), via network 110. Wearable device 106 includes integrated microcircuitry capable of displaying content to the user. Wearable device 106 includes display 116 and sensors 118, where display 116 allows for a user of wearable device 106 to view various notifications from keyword recommendation program 112. An example of a notification from keyword recommendation program 112 includes a request for user authorization to utilize data from wearable device 106 for providing keyword recommendations. In an embodiment where wearable device 106 is an electronic contact lens, display 116 is a semitransparent display and microlens array is integrated into wearable device 106 for viewing content. Wearable device 106 can also include a power storage module, a solar cell module for charging the power storage module, a biosensor module for collecting data (e.g., tracking eye movement), and a communications and power module for communicating with server computer 102, client device 104, and IoT devices 108 via network 110. Sensors 118 collect various data for the user of wearable device 106, where keyword recommendation program 112 utilizes the data collected by sensors 118 to provide keyword recommendations for a virtual keyboard in user interface 120 on client device 104. Sensors 118 can include one or more of: an accelerometer, a gyroscope sensor, an orientation sensor, a pedometer, a heart rate sensor, and a blood pressure sensor.

IoT devices 108 represent one or more electronic devices connected to network 110 capable of exchanging data with other devices (e.g., server computer 102, client device 104, and wearable device 106) via network 110. IoT devices 108 can include an instance of an intelligent virtual assistant (IVA) representing a software agent capable of performing various tasks for a user based on commands or questions provided by the user. IoT devices 108 can include but not limited to appliances, home security systems, health monitoring devices, factory equipment, wireless inventory trackers, biometric security scanners, and any other electronic device embedded with sensors and software for connecting and exchanging data with other devices and systems over the Internet (e.g., network 110).

Network 110 can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server computer 102, client device 104, wearable device 106, IoT devices 108, and other computing devices (not shown) within the distributed data processing environment.

Keyword recommendation program 112 establishes a knowledge corpus based on context for devices associated with a user, including client device 104, wearable device 106, and IoT devices 108. Keyword recommendation program 112 receives historical user interactions with client device 104, wearable device 106, and IoT devices 108. Keyword recommendation program 112 determines user utilization of client device 104, wearable device 106, and IoT devices 108, where user utilization includes how the user engages with each of the devices. Keyword recommendation program 112 identifies data generated by client device 104, wearable device 106, and IoT devices 108 and can store the data in database 114. Keyword recommendation program 112 generates a knowledge corpus for the client device 104, wearable device 106, and IoT device 108, where the knowledge corpus includes context for how each device correlates to the generated data for each of the devices.

Keyword recommendation program 112 provides keyword recommendations to a user inputting content to user interface 120 with a virtual keyboard utilizing the knowledge corpus. Keyword recommendation program 112 determines a user is interacting with a virtual keyboard in user interface 120 on client device 104 and determines context for written content in user interface 120 utilizing the virtual keyboard. Keyword recommendation program 112 identifies a role for the user with respect to the written content and identifies one or more of wearable device 106 and/or IoT devices 108 relating to the written content. Keyword recommendation program 112 identifies portions of the written content relating to the data generated by wearable device 106 and/or IoT devices 108 and identifies portions of the data generated by wearable device 106 and/or IoT devices 108 relating to the portions of the written content. Keyword recommendation program 112 coverts the portions of the data generated by wearable device 106 and/or IoT devices 108 to text and displays, in user interface 120 of client device 104, the test for the portions of the data generated by wearable device 106 and/or IoT devices 108. Keyword recommendation program 112 receives a text selection via user interface 120 on client device 104 and displays the text selection with the written content.

Database 114 is a repository that stores various data including operational data for client device 104, operational data from sensors 118 from wearable device 106, operational data for each IoT device 108, and any other data pertinent to keyword recommendation program 112 for providing keyword recommendations for a virtual keyboard in user interface 120 on client device 104. In the depicted embodiment, database 114 resides on server computer 102. In another embodiment, database 114 may reside on client device 104 or elsewhere within the distributed data processing environment provided directional command program 112 has access to database 114. A database is an organized collection of data, where database 114 can be implemented with any type of storage device capable of storing data and configuration files that can be accessed and utilized by keyword recommendation program 112, such as a database server, a hard disk drive, or a flash memory.

User interface 120 enables a user to make requests of or issue commands to server computer 102, client device 104, wearable device 106, and IoT device 108 via network 110. User interface 120 also enables the user to receive information and instructions in response on client device 104 via network 110. In one embodiment, a user of client device 104 accesses user interface 120 via voice commands in natural language. In one embodiment, user interface 120 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 120 enables a user of client device 104 to interact with an instance of keyword recommendation program 112 operating on server computer 102.

Figure 2:
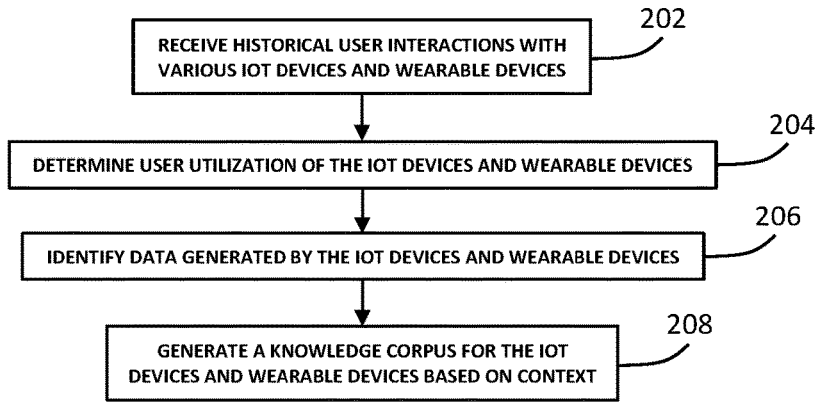
FIG. 2 depicts a flowchart for a keyword recommendation program establishing a knowledge corpus based on context for device associated with a user, in accordance with an embodiment of the present invention.

FIG. 2 depicts a flowchart for a keyword recommendation program establishing a knowledge corpus based on context for device associated with a user, in accordance with an embodiment of the present invention.

Keyword recommendation program 112 receives historical user interactions with various IoT devices and wearable devices (202). Keyword recommendation program 112 allows for a user to select a level of access to various IoT devices and wearable devices associated with the user, where the level of access defines an amount of information (i.e., data) that keyword recommendation program 112 receives from the various IoT devices and wearable devices associated with the user. Keyword recommendation program 112 ensures that a user's privacy is maintained and only a user defined amount of data is received with regards to the historical interactions with the various IoT devices and wearable devices associated with the user. In one embodiment, historical user interactions include instances of a user engaging with any of the various IoT devices and wearable devices associated with the user, where the user engages with a device via a user interface. An example of a user engaging with a device via a user interface can include a user inputting settings into a specific IoT device and a number of times the user activates the specific IoT device. Another example of a user engaging with a device via a user interface can includes a number of times a user has to reset a specific IoT device due to a fault condition and a time of day of each fault condition occurrence. In another embodiment, historical user interactions include instances of a user engaging with any of the various IoT devices and wearable devices and instances of data collection from the various IoT devices and wearable device, associated with the user. In an example of data collection from a wearable device, a user interacts with a fitness tracker when the fitness tracker is being worn by the user during the hours of 8 am and 8 pm, where the fitness tracker collects data for the user with the fitness tracker for that specific time frame.

Keyword recommendation program 112 determines user utilization of the IoT devices and wearable devices (204). For each historical user interaction with an IoT device or a wearable device, keyword recommendation program 112 identifies context surrounding the user interaction with the IoT device or wearable device. In one example, the historical user interaction included a user activating an IoT device or wearable device to perform an action. Keyword recommendation program 112 identifies context surrounding the performed action by the IoT device or the wearable device by identifying an action performed, a time of day for the action performed, a location for the action performed, and how the action performed relates to the user who activated the IoT device or the wearable device. In another example, the historical user interaction included a user activating an IoT device or wearable device to perform an action on the IoT device or the wearable device. Keyword recommendation program 112 identifies context surrounding the performed action by the user on the IoT device or the wearable device by identifying an action performed by the user, a time of day for the action performed by the user, a location for the action performed by the user, and how the action performed by the user relates to the activated IoT device or the wearable device. In yet another example, the historical user interaction an IoT device or a wearable device included a user activating an IoT device or wearable device to collect data for a pre-determined amount of time. Keyword recommendation program 112 identifies context surrounding the collection of data by the IoT device or the wearable device by identifying data collected, one or more sensors that collected the data, a time of day for the data collected, a location for the data collected, and how data collected by the one or more sensors related to the user who activated the IoT device or the wearable device.

Keyword recommendation program 112 identifies data generated by the IoT devices and wearable devices (206). For each historical user interaction with an IoT device or a wearable device, keyword recommendation program 112 identifies data generated by the IoT device or the wearable device. Keyword recommendation program 112 identifies the data generated by the IoT device or the wearable device according to the previously established privacy settings by the user in (202), where keyword recommendation program 112 has access to the data to which the user granted access to. In one example, keyword recommendation program 112 identifies data generated by a wearable device, where the wearable device is a fitness tracker. Keyword recommendation program 112 identifies the data generated as including heart rate values, blood pressure values, and step counter values, for the user associated with the fitness tracker. In another example, keyword recommendation program 112 identifies data generated by an IoT device, where the IoT device is a home security system. Keyword recommendation program 112 identifies the data generated as including one or more video files, one or more audio files, motion sensor values, instances of a window sensor activating, and instances of a door sensor activating.

Keyword recommendation program 112 generates a knowledge corpus for the IoT devices and wearable devices based on context (208). Keyword recommendation program 112 generates a knowledge corpus that correlates the data generated by the IoT devices and wearable devices to the historical user interactions with the IoT devices and the wearable devices. Keyword recommendation program 112 utilizes the knowledge corpus to analyze written content inputted by a user into a user interface on a client device utilizing a virtual keyboard and to identify IoT devices and wearable devices relating to the written content. The knowledge corpus, also referred to as a text corpus, is a language resource that include a structured set of text, where the structured set of text includes the data generated by the IoT devices and wearable devices to the historical user interactions with the IoT devices and the wearable devices.

Figure 3:
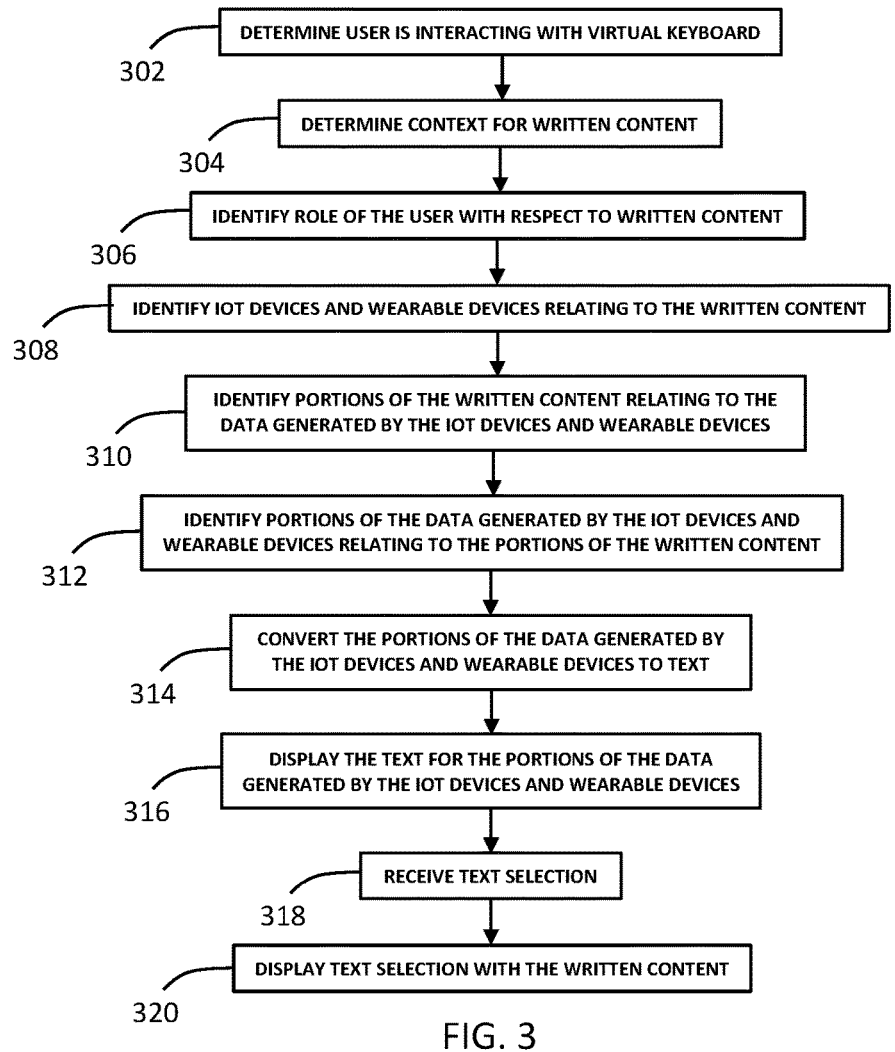
FIG. 3 depicts a flowchart for a keyword recommendation program providing keyword recommendations for a virtual keyboard, in accordance with an embodiment of the present invention.

FIG. 3 depicts a flowchart for a keyword recommendation program providing keyword recommendations for a virtual keyboard, in accordance with an embodiment of the present invention.

Keyword recommendation program 112 determines a user is interacting with a virtual keyboard (302). Keyword recommendation program 112 determines the user is interacting with a virtual keyboard in a user interface on a client device upon receiving a character selection from the virtual keyboard, where the character selection is placed into a text field in the user interface. In one example, keyword recommendation program 112 determines a user is interacting with a virtual keyboard upon a doctor (i.e., user) opening a patient's file via a user interface on a client device and inputting text into the patient's file utilizing the virtual keyboard. In another example, keyword recommendation program 112 determines a user is interacting with a virtual keyboard upon a technical specialist opening a customer maintenance log via a user interface on a client device and inputting text into the customer maintenance log utilizing the virtual keyboard.

Keyword recommendation program 112 determines context for written content (304). As written content is inputted by the user utilizing a virtual keyboard, keyword recommendation program 112 determines context for written content based on one or more words in the written content and one or more objects in a vicinity of a text field in which the one or more words are being inputted. The one or more objects represent letters, words, images, and/or symbols outside of the written content in the text field that provide context for a topic being of the one or more words of the written content. In one example, keyword recommendation program 112 determines context for written content based on the words "blood pressure" present in the written content inputted in a text field by a user utilizing a virtual keyboard. The text field includes the headings "patient name" and "vitals" in a vicinity of the written content inputted in the text field by the user utilizing the virtual keyboard. Keyword recommendation program 112 determines a context for the written content that includes a user inputting information into a medical record for a patient utilizing the virtual keyboard. In another example, keyword recommendation program 112 determines context for written content based on the words "Server A is experiencing faults" present in the written content inputted in a text field by a user utilizing a virtual keyboard. The text field includes the headings "Customer A" and "Technical Issue Summary" in a vicinity of the written content inputted in the text field by the user utilizing the virtual keyboard. Keyword recommendation program 112 determines a context for the written content that includes a user inputting information into a maintenance log for server equipment at a customer site utilizing the virtual keyboard.

Keyword recommendation program 112 identify role of the user with respect to written content (306). The user represents a person inputting written content into a text field in a user interface on a client device utilizing the virtual keyboard. Keyword recommendation program 112 identifies the role of the user with respect to written content based on the determined context for the written content. From the previous example where keyword recommendation program 112 determines a context for the written content that includes a user inputting information into a medical record for a patient, keyword recommendation program 112 identifies the role of the user inputting information into the medical record. Keyword recommendation program 112 identifies the role of the user as a medical professional (e.g., doctor, nurse) based on the determined context for the written content. Furthermore, keyword recommendation program 112 can query a program for profile information in which the written content is inputted to determine a specific user and associated title for the specific user. The determine specific user and associated tile can dictate a level of access to data generated by the IoT device and wearable device associated with the patient, discussed in further detail with regards to (308). From the previous example where keyword recommendation program 112 determines a context for the written content that includes a user inputting information into a maintenance log for server equipment at a customer site, keyword recommendation program 112 identifies the role of the user inputting information into the maintenance log. Keyword recommendation program 112 identifies the role of the user as a technical specialist for the server equipment based on the determined context for the written content. Furthermore, keyword recommendation program 112 can query a program for profile information in which the written content is inputted to determine a specific user and associated title for the specific user. The determine specific user and associated tile can dictate a level of access to data generated by the IoT device and wearable device associated with the customer, discussed in further detail with regards to (308).

Keyword recommendation program 112 identifies IoT devices and wearable devices relating to the written content (308). Based on the determined context for the written content, keyword recommendation program 112 identifies IoT devices and wearable devices relating to the written content utilizing a knowledge corpus. In one embodiment, keyword recommendation program 112 identifies the IoT devices and wearable devices associated with a user inputting the text utilizing the virtual keyboard. In another embodiment, keyword recommendation program 112 identifies IoT devices and wearable devices associated with a user identified within the written content of the inputted text and/or the one or more objects within a text field with the written content of the inputted text. From the previous example where keyword recommendation program 112 determines a context for the written content that includes a user inputting information into a medical record for a patient, keyword recommendation program 112 identifies IoT devices and wearable devices relating to the written content. Keyword recommendation program 112 identifies a wearable device associated with the patient associated with the medical record, where the patient previously opted-in via one or more privacy settings to allow for the user (i.e., doctor) to access data generated by the wearable device. Alternatively, if the patient with the wearable device is located within a vicinity of a client device with the user inputting information into the medical record for the patient, keyword recommendation program 112 can request to access data generated by the wearable device associated with the patient. In responsive to the patient granting access to the data generated by the wearable device associated with the patient, keyword recommendation program 112 identifies the wearable device associated with the patient as relating to the written content.

From the previous example where keyword recommendation program 112 determines a context for the written content that includes a user inputting information into a maintenance log for server equipment at a customer site, keyword recommendation program 112 identifies IoT devices and wearable devices relating to the written content. Keyword recommendation program 112 identifies multiple IoT devices relating to a security system associated with the customer site, where the customer previously opted-in via one or more privacy settings to allow for the user (i.e., technical specialist) to access data generated by the multiple devices. Alternatively, if the multiple IoT devices relating to the security system associated with the customer site are located within a vicinity of a client device with the user inputting information into the maintenance log, keyword recommendation program 112 can request to access data generated by the IoT devices relating to the security system. In responsive to the customer granting access to the data generated by the IoT devices relating to the security system, keyword recommendation program 112 identifies the IoT devices associated with the customer as relating to the written content.

Keyword recommendation program 112 identifies portions of the written content relating to the data generated by the IoT devices and wearable devices (310). Keyword recommendation program 112 parses the written content and identifies one or more references to the data generated by the identified IoT devices and wearable devices from (308). The one or more references can include but are not limited to letters, numbers, symbols, words, units of measurement, and file names. From a previous example, keyword recommendation program 112 determines a context for the written content that includes a user inputting information into a medical record for a patient, where the written content states, "Patient has trouble staying asleep and is averaging". Keyword recommendation program 112 identifies portions of the written content relating to the data generated by a wearable device associated with the patient, where the wearable device is a smartwatch. Keyword recommendation program 112 identifies the portions "asleep" and "averaging" as relating to the data generated by the smartwatch, where keyword recommendation program 112 considers "asleep" a variation of the word "sleep". Keyword recommendation program 112 identifies the portions "asleep" and "averaging" as relating to the data generated by the smartwatch, since the smartwatch includes an application capable of tracking sleep patterns for the patient.

From another previous example, keyword recommendation program 112 determines a context for the written content that includes a user inputting information into a maintenance log for server equipment at a customer site, where the written content states, "Server A has a broken security label and appears to be physically tampered with". Keyword recommendation program 112 identifies portions of the written content relating to the data generated by multiple IoT device associated with a security system at a customer site, where the multiple IoT devices are security cameras integrated into the security system. Keyword recommendation program 112 identifies the portions "security", "physically", and "tampered" as relating to the data generated by the security cameras, since keyword recommendation program 112 identifies a security issue relating to a physical tampering (i.e., onsite) versus a software tampering (i.e., potentially offsite). Keyword recommendation program 112 identifies the portion "security", "physically", and "tampered" as relating to the data generated by the security cameras, since the multiple security cameras can aperture an individual physically tampering with the Server A onsite, at the customer site.

Keyword recommendation program 112 identifies portions of the data generated by the IoT devices and wearable devices relating to the portions of the written content (312). Keyword recommendation program 112 parses the data generated by the identified IoT devices and wearable devices and identifies one or more references to portions of the data generated by the identified IoT devices and wearable devices relating to the portions of the written content. The one or more references can include but are not limited to letters, numbers, symbols, words, units of measurement, and file names. From a previous example, keyword recommendation program 112 determines a context for the written content that includes a user inputting information into a medical record for a patient, where the written content states, "Patient has trouble staying asleep and is averaging". Keyword recommendation program 112 previously identifies portions "asleep" and "averaging" of the written content as relating to the data generated by a smartwatch. Since the portions of the written content do not reference a period of time, keyword recommendation program 112 identifies a portion of the data generated by the smartwatch relating to the portion of the written content for a default time period (e.g., 7 days). Keyword recommendation program 112 can identify portions of the data generated by the smartwatch relating to portions of the written content for multiple periods of time (e.g., 7 days, 14 days, 21 days), where the user selects the portion of the generated data for a specific period of time. Alternatively, keyword recommendation program 112 can query the user to provide a specific period of time, prior to identifying portions of the data generated by the smartwatch relating to the portions of the written content. In this example, keyword recommendation program 112 identifies a portion of the data generated by the smartwatch relating to the portion of the written content as, 6.3 average hours of sleep over a default time period of 7 days.

From another previous example, keyword recommendation program 112 determines a context for the written content that includes a user inputting information into a maintenance log for server equipment at a customer site, where the written content states, "Server A has a broken security label and appears to be physically tampered with". Keyword recommendation program 112 previously identified portions of the written content relate to multiple security cameras, where the data generated includes video files from the multiple security cameras with a line of sight of Server A. Since the portions of the written content do not reference a period of time, keyword recommendation program 112 identifies a portion of the data generated by the multiple security camera (i.e., video files) relating to the portion of the written content for a default period of time. In this example, the default time period is a duration between the current maintenance inspection and a previous maintenance inspection (e.g., 36 hours). Keyword recommendation program 112 can identify portions of the data generated by the multiple security camera relating to portions of the written content for multiple periods of time (e.g., intervals of 6 hours for the 36 hours), where the user selects the portion (i.e., video file) of the generated data for a specific period of time. Alternatively, keyword recommendation program 112 can query the user to provide a specific period of time (e.g., between 2 am and 7 am), prior to identifying portions of the data generated by the multiple security cameras relating to the portions of the written content. In this example, keyword recommendation program 112 identifies a portion of the data generated by the multiple security cameras relating to the portion of the written content as, a video file for each of the multiple security camera with a default time period of 36 hours.

Keyword recommendation program 112 converts the portions of the data generated by the IoT devices and the wearable devices to text (314). Keyword recommendation program 112 converts the portions of the data generated by the IoT devices and the wearable devices to text for integration into the written content based on the context determined in (304). The converted portions of the data generated by the IoT devices and the wearable devices to text are selectable as the user engages with the virtual keyboard while inputting text into a text field in the user interface on the client device. From a previous example, keyword recommendation program 112 determines a context for the written content that includes a user inputting information into a medical record for a patient, where the written content states, "Patient has trouble staying asleep and is averaging". Keyword recommendation program 112 converts the portion of the data generated from the smartwatch (i.e., 6.3 average hours of sleep over a default time period of 7 days) to text, where converting to text include conforming the data generated to the written content. For the written content, "Patient has trouble staying asleep and is averaging", keyword recommendation program 112 converts the data generated to "6.3 hours of sleep". From another previous example, keyword recommendation program 112 determines a context for the written content that includes a user inputting information into a maintenance log for server equipment at a customer site, where the written content states, "Server A has a broken security label and appears to be physically tampered with". Keyword recommendation program 112 converts the portion of the data generated from the multiple security camera (i.e., a video file for each of the multiple security camera with a default time period of 36 hours) to a selectable file with text, where converting to the selectable file with text includes conforming the data generated to the written content. For the written content, "Server A has a broken security label and appears to be physically tampered with", keyword recommendation program 112 converts the data generated to "as captured by multiple security cameras A, B, and C". Furthermore, keyword recommendation program 112 can attach video files for the multiple security cameras A, B, and C, corresponding to the default time period of 36 hours.

Keyword recommendation program 112 display the text for the portions of the data generated by the IoT devices and wearable device (316). Keyword recommendation program 112 displays the text for the portions of the data generated in a portion of the user interface with the virtual keyboard as a recommendation to a user inputting text into a text field in the user interface. The text for the portions of the data generated is selectable by the user inputting text into the text field in the user interface, where the selection integrates the text for the portions of the data generated into the written content.

Keyword recommendation program 112 receives text selection (318). From a previous example, keyword recommendation program 112 determines a context for the written content that includes a user inputting information into a medical record for a patient, where the written content states, "Patient has trouble staying asleep and is averaging". Keyword recommendation program 112 displays the text, "6.3 hours of sleep", for the portion of the data generated by the smartwatch. Keyword recommendation program 112 receives a text selection of "6.3 hours of sleep" for integration into the written content. In another previous example, keyword recommendation program 112 determines a context for the written content that includes a user inputting information into a maintenance log for server equipment at a customer site, where the written content states, "Server A has a broken security label and appears to be physically tampered with". Keyword recommendation program 112 displays the text, "as captured by multiple security cameras A, B, and C", for the portion of the data generated by the multiple security cameras, Keyword recommendation program 112 receives a text selection of "as captured by multiple security cameras A, B, and C" for integration into the written content.

Keyword recommendation program 112 displays text selection with the written content (320). Keyword recommendation program 112 displays the text selection with the written content in the text field in the user interface, where the user can continue to seamlessly input text utilizing the virtual keyboard as keyword recommendation program 112 continues to determine a context for any newly written content and provide new recommendations to the user. In a previous example where the written content includes, "Patient has trouble staying asleep and is averaging" and the text selection includes, "6.3 hours of sleep", keyword recommendation program 112 displays, "Patient has trouble staying asleep and is averaging 6.3 hours of sleep" in the text field in the user interface. In another previous example where the written content includes, "Server A has a broken security label and appears to be physically tampered with" and the text selection includes, "as captured by multiple security cameras A, B, and C", keyword recommendation program 112 displays, "Server A has a broken security label and appears to be physically tampered with as captured by multiple security cameras A, B, and C". Furthermore, keyword recommendation program 112 attaches multiple video files for the multiple security cameras A, B, and C, corresponding to the default time period of 36 hours.

Figure 4:
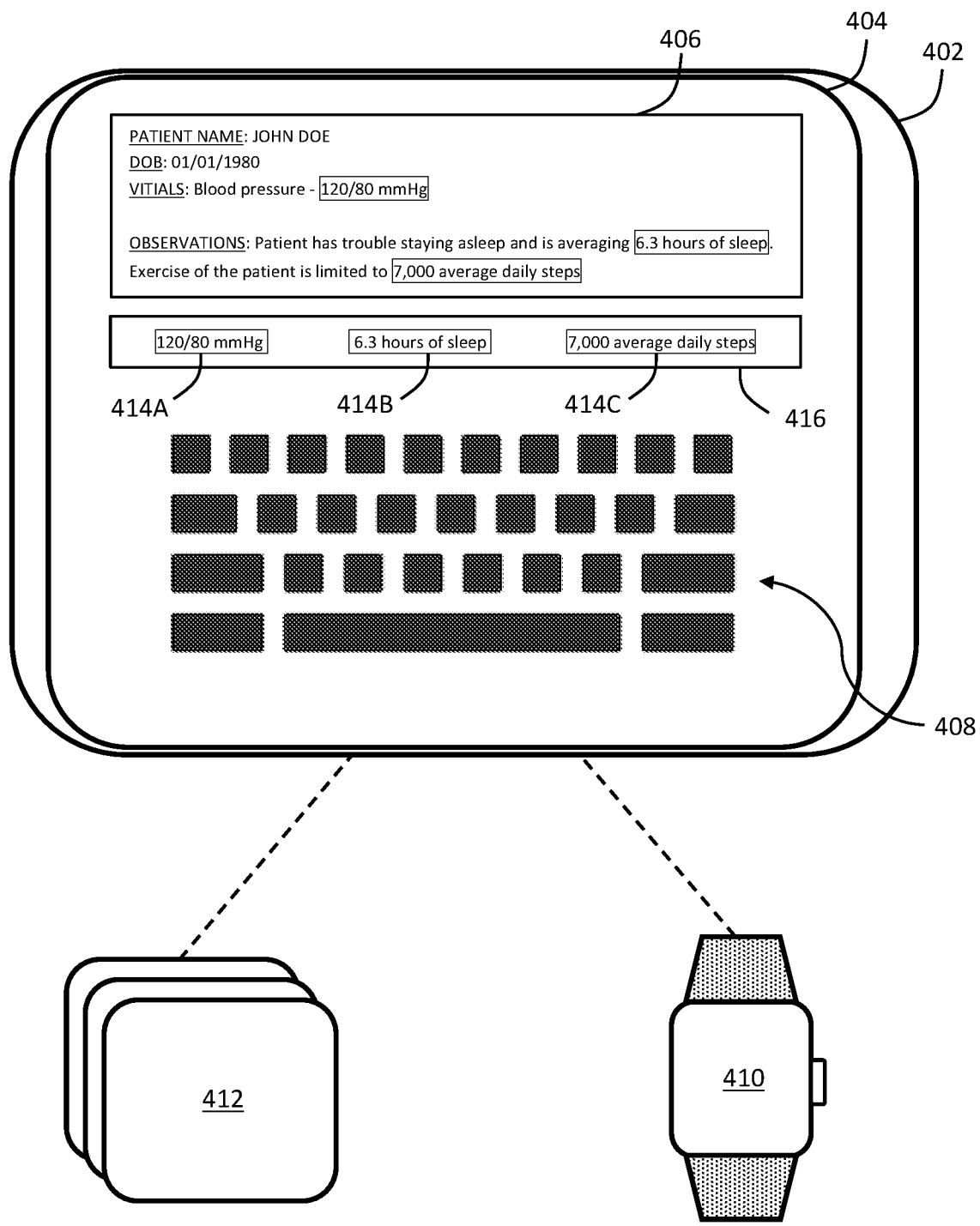
FIG. 4 illustrates an example of a keyword recommendation program providing keyword recommendations for a virtual keyboard, in accordance with an embodiment of the present invention.

FIG. 4 illustrates an example of a keyword recommendation program providing keyword recommendations for a virtual keyboard, in accordance with an embodiment of the present invention.

In this example, a user engaging with client device 402 is a medical professional inputting patient information into a medical record. User interface 404 includes text field 406, where the medical professional inputs text utilizing virtual keyboard 408. As the medical professional inputs text into text field 406 utilizing virtual keyboard 408 in user interface 404. The headings, "PATIENT NAME", "DOB", "VITIALS", and "OBSERVATIONS" represent areas in text field 406 for the medical profession to provide written content through text inputs utilizing virtual keyboard 408. Keyword recommendation program 112 determines the user is interacting with virtual keyboard 408 as the medical professional enters the patient's name (i.e., John Doe), the patient's date of birth (i.e., Jan. 1/1980), and text relating to the patient's vitals (i.e., blood pressure). Keyword recommendation program 112 determines the context for the written content is a medical professional inputting patient information into the medical record based on the inputted text and the headings in the text field. Keyword recommendation program 112 identifies the role of the user (i.e., medical professional) with respect to the written content. Keyword recommendation program 112 identifies wearable device 410 and IoT devices 412 relating to the written content and identifies portions of the written content relating to the data generated by wearable device 410 and IoT devices 412. In this example, the portion of the written content relating to the data generated by wearable device 410 and IoT devices 412 includes the patient's name, "John Doe" and "Blood Pressure".

Keyword recommendation program 112 identifies portions of the data generated by wearable device 410 and IoT devices 412 relating to the portions of the written content, converts the portion of the data generated by wearable device 410 and IoT devices 412 to text, and displays the text for the portions of the data generated by wearable device 410 and IoT devices 412 as first text recommendation 414A in recommendation field 416 in user interface 404. First text recommendation 414A is selectable by the medical professional inputting text into text field 406, where first text recommendation 414A includes the blood pressure reading "120/800 mmHg" as received from wearable device 410. Keyword recommendation program 112 receives a text selection via a touch input through a touch screen on client device 402, where the medical professional selects first text recommendation 414A for insertion after the written text "Blood pressure" in text field 406. Keyword recommendation program 112 displays the text selection with the written content as, "Blood pressure—120/80 mmHg" associated with the heading "VITIALS" in text field 406.

As the medical professional continues to input text into text field 406 utilizing virtual keyboard 408 in user interface 404, Keyword recommendation program 112 determines the context for the written content is a medical professional inputting patient information into the medical record based on the inputted text and the headings in the text field. Keyword recommendation program 112 identifies the role of the user (i.e., medical professional) with respect to the written content. Keyword recommendation program 112 identifies wearable device 410 and IoT devices 412 relating to the written content and identifies portions of the written content relating to the data generated by wearable device 410 and IoT devices 412. In this example, the portion of the written content relating to the data generated by wearable device 410 and IoT devices 412 includes the patient's name, "John Doe", "asleep", and "averaging".

Keyword recommendation program 112 identifies portions of the data generated by wearable device 410 and IoT devices 412 relating to the portions of the written content, converts the portion of the data generated by wearable device 410 and IoT devices 412 to text, and displays the text for the portions of the data generated by wearable device 410 and IoT devices 412 as second text recommendation 414B in recommendation field 416 in user interface 404. Second text recommendation 414B is selectable by the medical professional inputting text into text field 406, where second text recommendation 414B includes a value for an average amount of daily sleep over a default of 7 days as received from wearable device 410 and keyword recommendation program 112 generated contextual text for the value. Second text recommendation 414B states, "6.3 hours of sleep", where the value with the contextual text for the value conforms to the written text inputted by the medical professional. Keyword recommendation program 112 receives a text selection via a touch input through a touch screen on client device 402, where the medical professional selects second text recommendation 414B for insertion after the written text "Patient has trouble staying asleep and is averaging" in text field 406. Keyword recommendation program 112 displays the text selection with the written content as, "Patient has trouble staying asleep and is averaging 6.3 hours of sleep" associated the heading "OBSERVATIONS" in text field 406.

As the medical professional continues to input text into text field 406 utilizing virtual keyboard 408 in user interface 404, Keyword recommendation program 112 determines the context for the written content is a medical professional inputting patient information into the medical record based on the inputted text and the headings in the text field. Keyword recommendation program 112 identifies the role of the user (i.e., medical professional) with respect to the written content. Keyword recommendation program 112 identifies wearable device 410 and IoT devices 412 relating to the written content and identifies portions of the written content relating to the data generated by wearable device 410 and IoT devices 412. In this example, the portion of the written content relating to the data generated by wearable device 410 and IoT devices 412 includes the patient's name, "Exercise", "patient", and "limited".

Keyword recommendation program 112 identifies portions of the data generated by wearable device 410 and IoT devices 412 relating to the portions of the written content, converts the portion of the data generated by wearable device 410 and IoT devices 412 to text, and displays the text for the portions of the data generated by wearable device 410 and IoT devices 412 as third text recommendation 414C in recommendation field 416 in user interface 404. Third text recommendation 414C is selectable by the medical professional inputting text into text field 406, where third text recommendation 414C includes a value for an average amount of daily steps over a default of 7 days as received from wearable device 410 and keyword recommendation program 112 generated contextual text for the value. Third text recommendation 414B states, "7,000 average daily steps", where the value with the contextual text for the value conforms to the written text inputted by the medical professional. Keyword recommendation program 112 receives a text selection via a touch input through a touch screen on client device 402, where the medical professional selects third text recommendation 414C for insertion after the written text "Exercise of the patient is limited to" in text field 406. Keyword recommendation program 112 displays the text selection with the written content as, "Exercise of the patient is limited to 7,000 average daily steps" associated with the heading "OBSERVATIONS" in text field 406.

Figure 5:
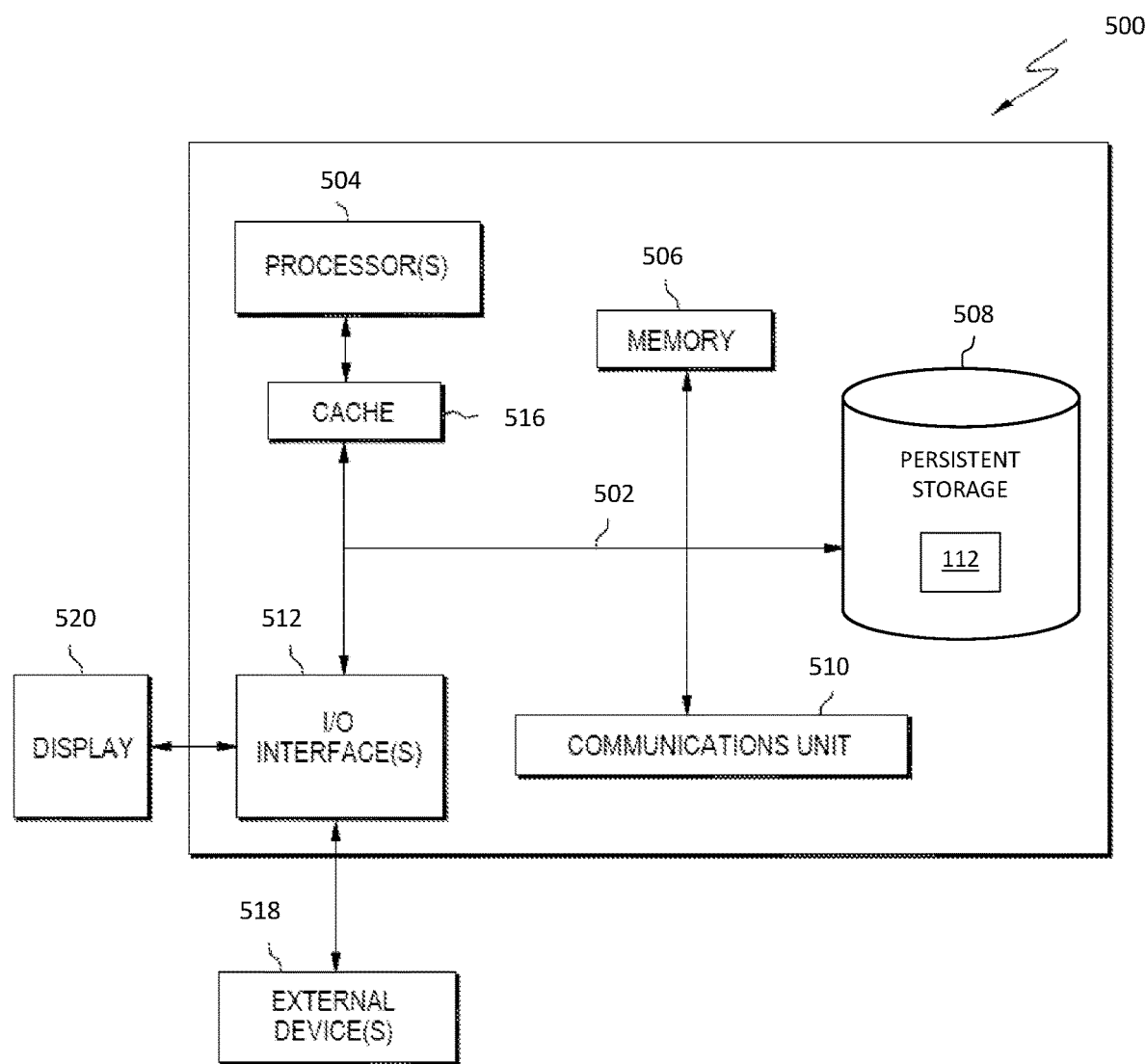
FIG. 5 is a block diagram of components of a computer system, such as the server computer of FIG. 1, in accordance with an embodiment of the present invention.

FIG. 5 depicts computer system 500, where server computer 102 is an example of a computer system 500 that includes keyword recommendation program 112. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
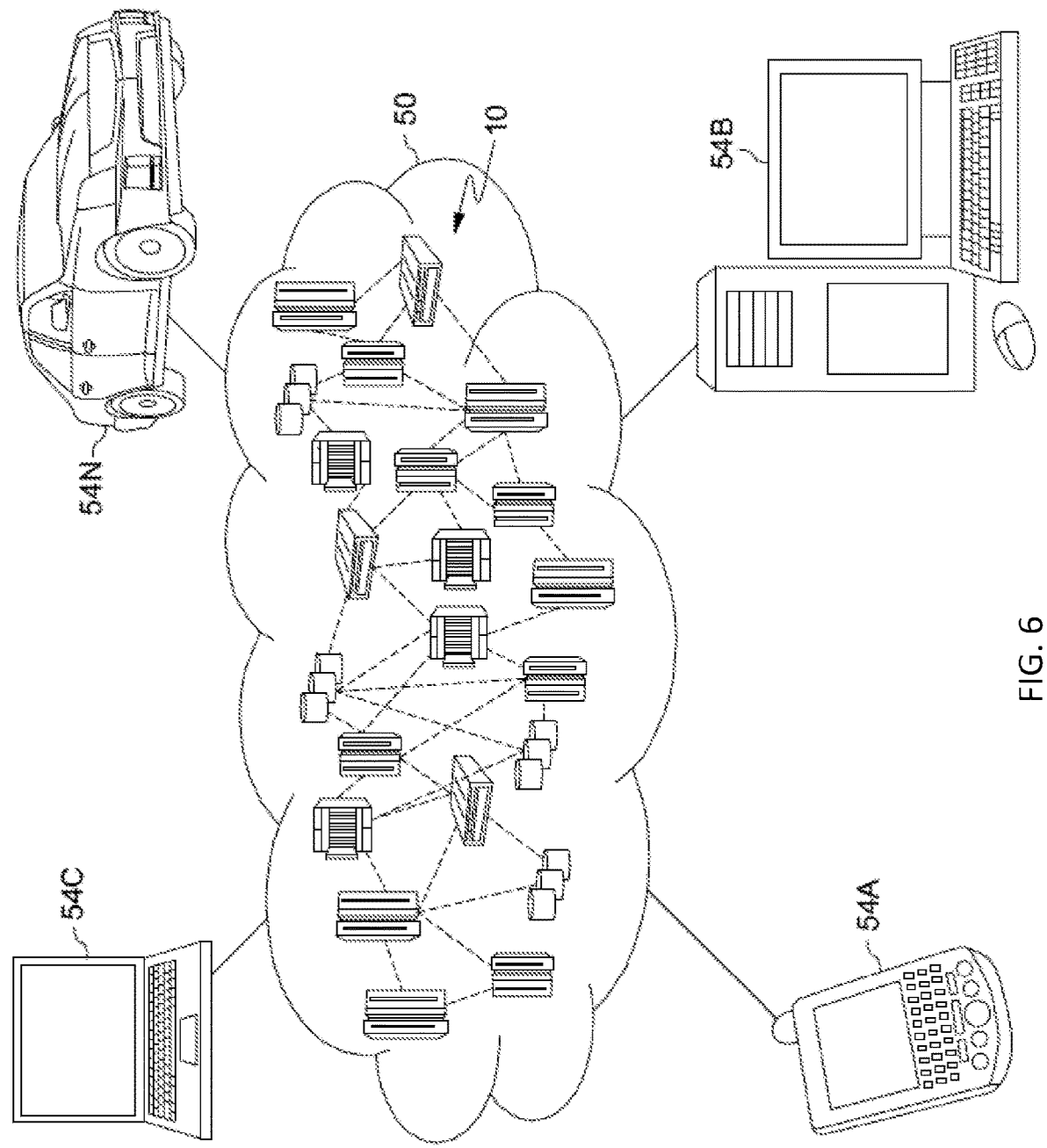
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
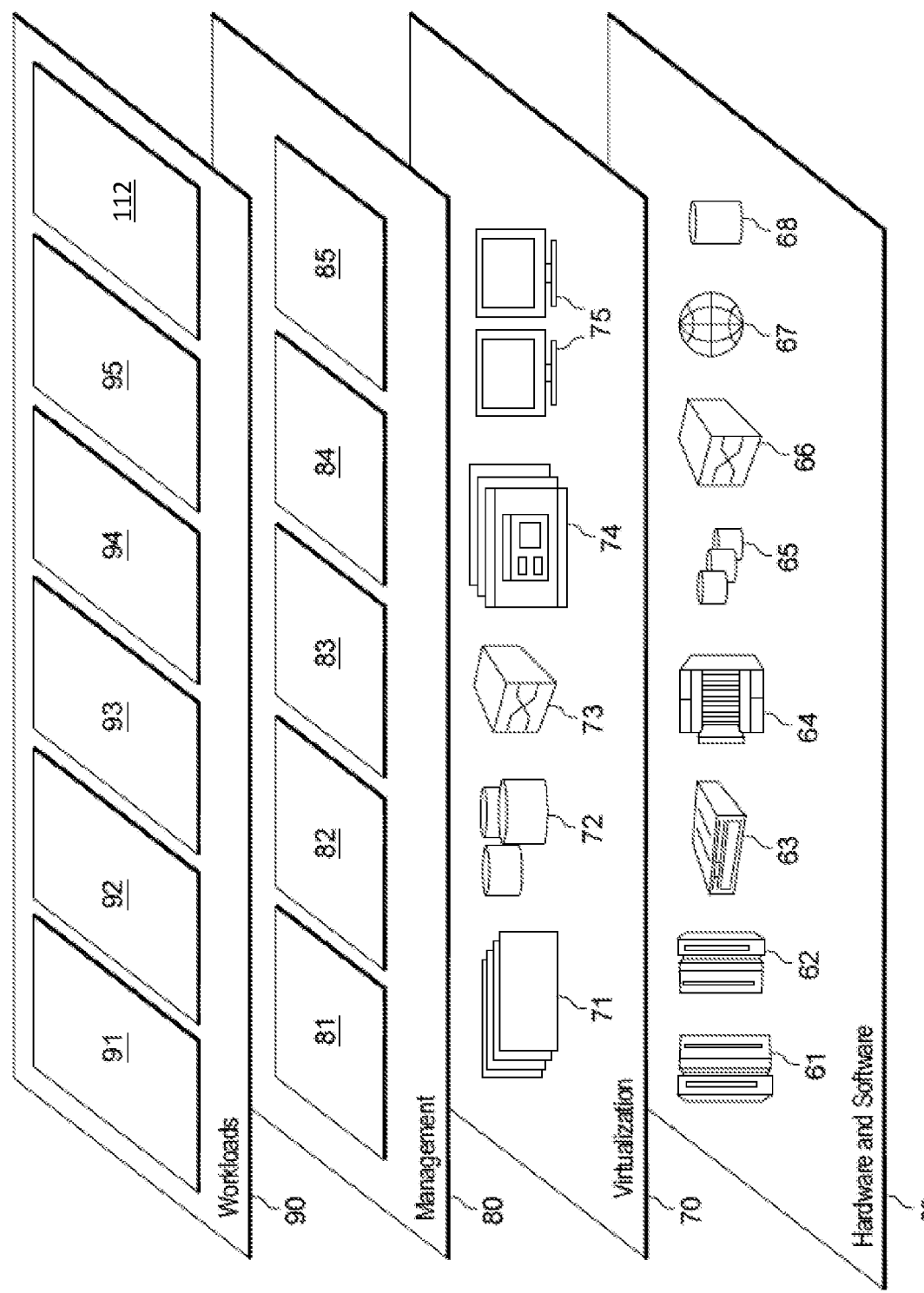
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and keyword recommendation program 112.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   responsive to determining a user is interacting with a virtual keyboard on a first device, identifying one or more other devices associated with text inputted as written content into a text field in a user interface on the first device;
   identifying one or more portions of the text inputted as written content relating to measured data values generated by the one or more other devices;
   identifying one or more portions of the measured data values generated by the one or more other devices relating to the one or more portions of the text inputted as written content;
   determining a context for the written content in the text field in the user interface based on a first set of one or more words present in the written content and one or more objects displayed in the text field in addition to the text inputted as the written content;
   converting the one or more portions of the measured data values generated by the one or more other devices relating to the one or more portions of the text inputted as written content to text, wherein the converting includes conforming the measured data values to the text inputted as the written content based on the determined context by adding a second set of one or more words to quantitatively describe the one or more portions of the measured data values;
   responsive to converting the one or more portions of the measured data values to the text, displaying the text converted from the one or more portions of the measured data values generated by the one or more other devices, wherein the text converted from the one or more portions of the measured data values generated by the one or more other devices is selectable by the user via the user interface on the first device; and responsive to receiving a text selection with the text converted from the one or more portion of the measured data values generated by the one or more other devices, displaying the text selection with the text converted from the one or more portions of the measured data values generated by the one or more devices with the written content in the text field in the user interface on the first device.

2. The computer-implemented method of claim 1, further comprising:
receiving a plurality of historical user interactions with a plurality of devices;
determining user utilization of the plurality of devices based on the plurality of historical user interactions;
identifying the measured data values generated by each device from the plurality of devices, wherein the plurality of devices includes the one or more other devices; and
generating a knowledge corpus for the plurality of devices based on a context for each device from the plurality of devices, wherein the context correlates the measured data values generated by each device from the plurality of devices to each historical user interaction from the plurality of historical user interactions.

3. The computer-implemented method of claim 1, further comprising:
identifying a role for the user with respect to the written content, wherein the role dictates a level of access to the measured data values generated by the one or more other devices.

4. The computer-implemented method of claim 3, wherein the one or more other devices are associated with another user.

5. The computer-implemented method of claim 1, wherein identifying the one or more portions of the written content further comprises:
parsing the written content in the text field; and
identifying one or more references to the measured data values generated by the one or more other devices, wherein the one or more references are selected from a group consisting of: letters, numbers, symbols, words, units of measurement, and file names.

6. The computer-implemented method of claim 1, wherein identifying the one or more portions of the measured data values generated further comprises:
parsing the measured data values generated by the one or more other devices; and
identifying one or more references to the one or more portions of the measured data values generated by the one or more other devices, wherein the one or more references are selected from a group consisting of: letters, numbers, symbols, words, units of measurement, and file names.

7. The computer-implemented method of claim 1, wherein the text converted from the one or more portions of the measured data values generated by the one or more other devices includes a first measured data value from the one or more portions of the measured data values generated by the one or more other devices that conforms to the text inputted as written content.

8. A computer program product comprising one or more computer readable storage media and program instructions collectively stored on the one or more computer readable storage media, the stored program instructions executable by one or more computer processors, the stored program instructions comprising:

program instructions to, responsive to determining a user is interacting with a virtual keyboard on a first device, identify one or more devices associated with text inputted as written content into a text field in a user interface on the first device;
program instructions to identify one or more portions of the text inputted as written content relating to measured data values generated by the one or more other devices;
program instructions to identify one or more portions of the measured data values generated by the one or more other devices relating to the one or more portions of the text inputted as written content;
program instructions to determine a context for the written content in the text field in the user interface based on a first set of one or more words present in the written content and one or more objects displayed in the text field in addition to the text inputted as the written content;
program instructions to convert the one or more portions of the measured data values generated by the one or more other devices relating to the one or more portions of the text inputted as written content to text, wherein the converting includes conforming the measured data values to the text inputted as the written content based on the determined context by adding a second set of one or more words to quantitatively describe the one or more portions of the measured data values;
program instructions to, responsive to converting the one or more portions of the measured data values to the text, display the text converted from the one or more portions of the measured data values generated by the one or more other devices, wherein the text converted from the one or more portions of the measured data values generated by the one or more other devices is selectable by the user via the user interface on the first device; and
program instructions to, responsive to receiving a text selection with the text converted from the one or more portion of the measured data values generated by the one or more other devices, display the text selection with the text converted from the one or more portions of the measured data values generated by the one or more devices with the written content in the text field in the user interface on the first device.

9. The computer program product of claim 8, the stored program instructions further comprising:
program instructions to receive a plurality of historical user interactions with a plurality of devices;
program instructions to determine user utilization of the plurality of devices based on the plurality of historical user interactions;
program instructions to identify the measured data values generated by each device from the plurality of devices, wherein the plurality of devices includes the one or more other devices; and
program instructions to generate a knowledge corpus for the plurality of devices based on a context for each device from the plurality of devices, wherein the context correlates the measured data values generated by each device from the plurality of devices to each historical user interaction from the plurality of historical user interactions.

10. The computer program product of claim 8, the stored program instructions further comprising:
program instructions to identify a role for the user with respect to the written content, wherein the role dictates a level of access to the measured data values generated by the one or more other devices.

11. The computer program product of claim 10, wherein the one or more other devices are associated with another user.

12. The computer program product of claim 8, wherein program instructions to identify the one or more portions of the written content further comprises:
- program instructions to parse the written content in the text field; and
- program instructions to identify one or more references to the measured data values generated by the one or more other devices, wherein the one or more references are selected from a group consisting of: letters, numbers, symbols, words, units of measurement, and file names.

13. The computer program product of claim 8, wherein program instructions to identify the one or more portions of the measured data values generated further comprises:
- program instructions to parse the measured data values generated by the one or more other devices; and
- program instructions to identify one or more references to the one or more portions of the measured data values generated by the one or more other devices, wherein the one or more references are selected from a group consisting of: letters, numbers, symbols, words, units of measurement, and file names.

14. The computer program product of claim 8, wherein the text converted from the one or more portions of the measured data values generated by the one or more other devices includes a first measured data value from the one or more portions of the measured data values generated by the one or more other devices that conforms to the text inputted as written content.

15. A computer system comprising:
- one or more computer processors;
- one or more computer readable storage media; and
- program instructions stored on the computer readable storage media for execution by at least one of the one or more computer processors, the program instructions comprising:
  - program instructions to, responsive to determining a user is interacting with a virtual keyboard on a first device, identify one or more devices associated with text inputted as written content into a text field in a user interface on the first device;
  - program instructions to identify one or more portions of the text inputted as written content relating to measured data values generated by the one or more other devices;
  - program instructions to identify one or more portions of the measured data values generated by the one or more other devices relating to the one or more portions of the text inputted as written content;
  - program instructions to determine a context for the written content in the text field in the user interface based on a first set of one or more words present in the written content and one or more objects displayed in the text field in addition to the text inputted as the written content;
  - program instructions to convert the one or more portions of the measured data values generated by the one or more other devices relating to the one or more portions of the text inputted as written content to text, wherein the converting includes conforming the measured data values to the text inputted as the written content based on the determined context by adding a second set of one or more words to quantitatively describe the one or more portions of the measured data values;
  - program instructions to, responsive to converting the one or more portions of the measured data values to the text, display the text converted from the one or more portions of the measured data values generated by the one or more other devices, wherein the text converted from the one or more portions of the measured data values generated by the one or more other devices is selectable by the user via the user interface on the first device; and
  - program instructions to, responsive to receiving a text selection with the text converted from the one or more portion of the measured data values generated by the one or more other devices, display the text selection with the text converted from the one or more portions of the measured data values generated by the one or more devices with the written content in the text field in the user interface on the first device.

16. The computer system of claim 15, the stored program instructions further comprising:
- program instructions to receive a plurality of historical user interactions with a plurality of devices;
- program instructions to determine user utilization of the plurality of devices based on the plurality of historical user interactions;
- program instructions to identify the measured data values generated by each device from the plurality of devices, wherein the plurality of devices includes the one or more other devices; and
- program instructions to generate a knowledge corpus for the plurality of devices based on a context for each device from the plurality of devices, wherein the context correlates the measured data values generated by each device from the plurality of devices to each historical user interaction from the plurality of historical user interactions.

17. The computer system of claim 15, the stored program instructions further comprising:
- program instructions to identify a role for the user with respect to the written content, wherein the role dictates a level of access to the measured data values generated by the one or more other devices.

18. The computer system of claim 17, wherein the one or more other devices are associated with another user.

19. The computer system of claim 15, wherein program instructions to identify the one or more portions of the written content further comprises:
- program instructions to parse the written content in the text field; and
- program instructions to identify one or more references to the measured data values generated by the one or more other devices, wherein the one or more references are selected from a group consisting of: letters, numbers, symbols, words, units of measurement, and file names.

20. The computer system of claim 15, wherein program instructions to identify the one or more portions of the measured data values generated further comprises:
- program instructions to parse the measured data values generated by the one or more other devices; and program instructions to identify one or more references to the one or more portions of the measured data values generated by the one or more other devices, wherein the one or more references are selected from a group consisting of: letters, numbers, symbols, words, units of measurement, and file names.

\* \* \* \* \*